United States Patent
Ciudad et al.

(10) Patent No.: US 12,067,271 B2
(45) Date of Patent: *Aug. 20, 2024

(54) DATA MIGRATION SYNCHRONIZATION PROCESS USING A MANIFEST FROM A SOURCE DEVICE TO A NEW DESTINATION DEVICE

(71) Applicant: Apple Inc., Cupertino, CA (US)

(72) Inventors: Jean-Pierre Ciudad, San Francisco, CA (US); George C. Chicioreanu, Sunnyvale, CA (US); Yan Arrouye, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,308

(22) Filed: Jun. 20, 2023

(65) Prior Publication Data

US 2023/0350590 A1 Nov. 2, 2023

Related U.S. Application Data

(63) Continuation of application No. 17/452,850, filed on Oct. 29, 2021, now Pat. No. 11,720,265, which is a continuation of application No. 16/677,530, filed on Nov. 7, 2019, now Pat. No. 11,163,466.

(60) Provisional application No. 62/854,880, filed on May 30, 2019.

(51) Int. Cl.
*G06F 3/06* (2006.01)
*G06F 8/65* (2018.01)

(52) U.S. Cl.
CPC .......... *G06F 3/0632* (2013.01); *G06F 3/0607* (2013.01); *G06F 3/0647* (2013.01); *G06F 3/0653* (2013.01); *G06F 3/067* (2013.01); *G06F 8/65* (2013.01)

(58) Field of Classification Search
CPC ...... G06F 3/062; G06F 3/0607; G06F 3/0647; G06F 3/0653; G06F 3/067; G06F 8/65
See application file for complete search history.

(56) References Cited

U.S. PATENT DOCUMENTS

| | | | |
|---|---|---|---|
| 10,133,868 B2 | 11/2018 | Wright et al. | |
| 10,212,596 B2 | 2/2019 | Wilson et al. | |
| 10,904,068 B2 | 1/2021 | Mittal et al. | |
| 11,086,662 B2 | 8/2021 | Khurange | |
| 11,163,466 B2 | 11/2021 | Ciudad et al. | |
| 11,169,835 B1 * | 11/2021 | Duong | G06F 9/4856 |
| 11,720,265 B2 * | 8/2023 | Ciudad | G06F 3/0607 713/2 |
| 2010/0242045 A1 | 9/2010 | Swamy et al. | |
| 2011/0099548 A1 | 4/2011 | Shen et al. | |
| 2013/0152076 A1 | 6/2013 | Patel | |

(Continued)

*Primary Examiner* — Tammara R Peyton
(74) *Attorney, Agent, or Firm* — Invoke

(57) ABSTRACT

In some implementations, a computing device may configure a new device based on a current state of an old device, including settings, preferences, and other user data. The data may be transferred from the old device to the new device, and then relocated according to a manifest that details positions of the data on the old device. The destination device may be rebooted into a configuration mode to allow for the relocation of the transferred data, and then rebooted again to configure the destination device to provide access to the data in its respective relative locations on the destination device.

20 Claims, 10 Drawing Sheets

(56) References Cited

U.S. PATENT DOCUMENTS

2013/0268999 A1 10/2013 Kiang et al.
2014/0082717 A1 3/2014 Kang et al.
2016/0142485 A1 5/2016 Mitkar et al.

* cited by examiner

DATA MIGRATION SYNCHRONIZATION PROCESS USING A MANIFEST FROM A SOURCE DEVICE TO A NEW DESTINATION DEVICE

INCORPORATION BY REFERENCE; DISCLAIMER

Each of the following applications are hereby incorporated by reference: application Ser. No. 17/452,850 filed on Oct. 29, 2021; application Ser. No. 16/677,530 filed on Nov. 7, 2019; application No. 62/854,880 filed on May 30, 2019. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to initial configuration of an electronic device, and more particularly, to automatically migrating data from an old device to a new device.

BACKGROUND

When a person purchases a new electronic device, the person typically desires to have all of the data from his or her old device be transferred to the new device. Utilizing a third-party service to transfer the data between the devices may lead to privacy and content ownership issues and also may be burdensome on the person should the person need to monitor the progress of the transfer and provide input to continue the process at certain points. Moreover, the data transfer via the third-party service may not be performed in a secure, efficient, and optimal manner. Also, sometimes a data network connection may not be available for performing the transfer, or may not be desired, due to privacy concerns. Furthermore, some data may not be transferred and lost in the process, which may be view as a serious breach of the person's trust in the manufacturer of the electronic device. However, most conventional configuration routines for new electronic devices do not address all of these concerns.

SUMMARY

In some implementations, a computing device may configure a new device based on a current state of an old device, including settings, preferences, and other user data. The data may be transferred from the old device to the new device, and then relocated according to a manifest that details positions of the data on the old device. The destination device may be rebooted into a configuration mode to allow for the relocation of the transferred data, and then rebooted again to configure the destination device to provide access to the data in its respective relative locations on the destination device.

Particular implementations provide at least the following advantages. The new device may be set up automatically in accordance with the configuration of the old device, thereby allowing a user to use the new device immediately upon acquiring the new device, without needing to re-install applications used by the user on the old device and reconfigure all the settings and preferences of the new device to mimic the look and feel of the old device. In addition, by using a peer-to-peer connection and not relying on other communication methods like Wi-Fi, the setup of the new device may take place even when Internet connectivity is not possible or is limited in speed or bandwidth.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Examples provided herein add context and aid in the understanding of the described embodiments. It will be apparent to one skilled in the art that the described embodiments may be practiced without some or all of these specific details or performed in a different order to obtain the same effect. In other instances, well known process steps may not be described in detail in order to avoid convoluting the described embodiments. Other applications are possible, such that the following examples should not be taken as limiting.

The embodiments described herein set forth techniques for enabling data migration between a source device (e.g., old device) and a destination device (e.g., new device) for initially setting up the destination device. According to some embodiments, the data migration may be carried out over a private wireless network established between the source device and destination device, over a wireless peer-to-peer connection, over a physical wired connection, or via a direct connection. Accordingly, the techniques described herein provide a mechanism for migrating data between the source and destination devices that are owned by a user in a secure manner. A more detailed discussion of these techniques is set forth below.

Figure 1A:
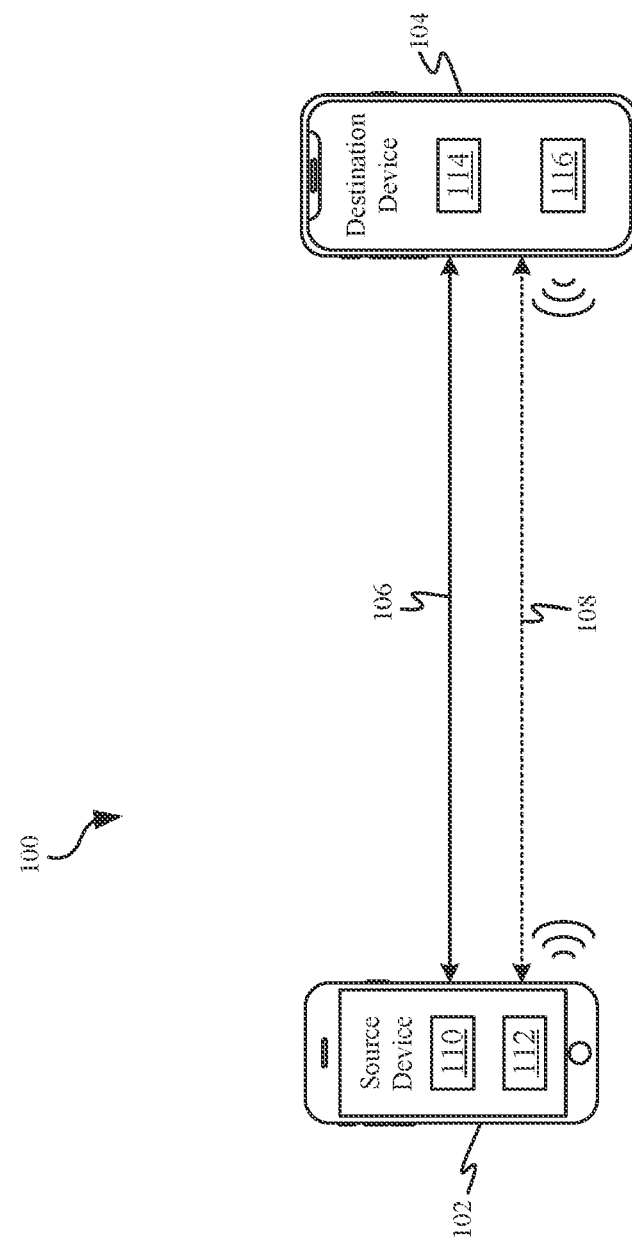
FIGS. 1A-1B illustrate block diagrams of example systems for migrating data from a source device to a destination device for initial setup of the destination device.

FIG. 1A illustrates a block diagram of an example system 100 for migrating data from a source device 102 (e.g., old device) to a destination device 104 (e.g., new device) for initial setup of the destination device 104. In one approach, each of source device 102 and destination device 104 may be owned and/or operated by a same user (e.g., associated with the same user account as described later), but embodiments set forth herein are not limited to such a scenario.

Source device 102 may be any type of mobile computing device, such as a smartphone, mobile phone, tablet computer, notebook computer, laptop computer, etc., that runs a first operating system (OS). Destination device 104 may be any type of mobile computing device running a second OS. Moreover, destination device 104 may be a computing device of the same type or different type as source device 102, in an example.

According to an example, destination device 104 may be a new smartphone that has been recently purchased or recently acquired by a user and source device 102 may be the user's old smartphone that the user owns and has been operating over time, such as a generation older smartphone. The user, in this example, may desire to transfer all the user's data from the old smartphone to the new smartphone such that the transition from the old smartphone to the new smartphone is seamless for the user.

The data that is migrated from source device 102 to destination device 104 may include, for example, contact information, calendar information, messages and message history, emails, bookmarks, wallpaper settings, information regarding installed applications, photos, videos, songs, movies, books, other media, personal data, messages, social media posts, files, documents, device and application settings, device and application preferences, applications, and/or other irreplaceable data.

In another example, source device 102 may be connected directly to destination device 104 via direct connection 106. Direct connection 106 may be a hardwire connection in an example.

In another example, source device 102 may be connected to destination device 104 via a wireless connection 108. Any type of wireless connection 108 may be used, such as Bluetooth, peer-to-peer network, near-field communication (NFC), ultra wideband (UWB), etc.

These peer-to-peer connections 106, 108 may be used to transfer data from source device 102 to destination device 104 in order to setup and/or configure destination device 104 in a manner similar to how source device 102 is setup and/or configured. This similarity may take into account any underlying differences between devices, such as different operating systems, memory capacity, display size, native applications installed, etc.

Although not shown in FIG. 1A, processor 110, in conjunction with memory 112, may execute and/or provide first OS that is configured to execute various applications (e.g., native OS applications and/or user applications) on source device 102. Similarly, processor 114, in conjunction with memory 116, may execute and/or provide second OS that is configured to execute various applications (e.g., native OS applications and user applications) on destination device 104. Second OS may be the same or different from first OS, and any compatibility issues between the various operating systems may be overcome using techniques described herein.

Figure 1B:
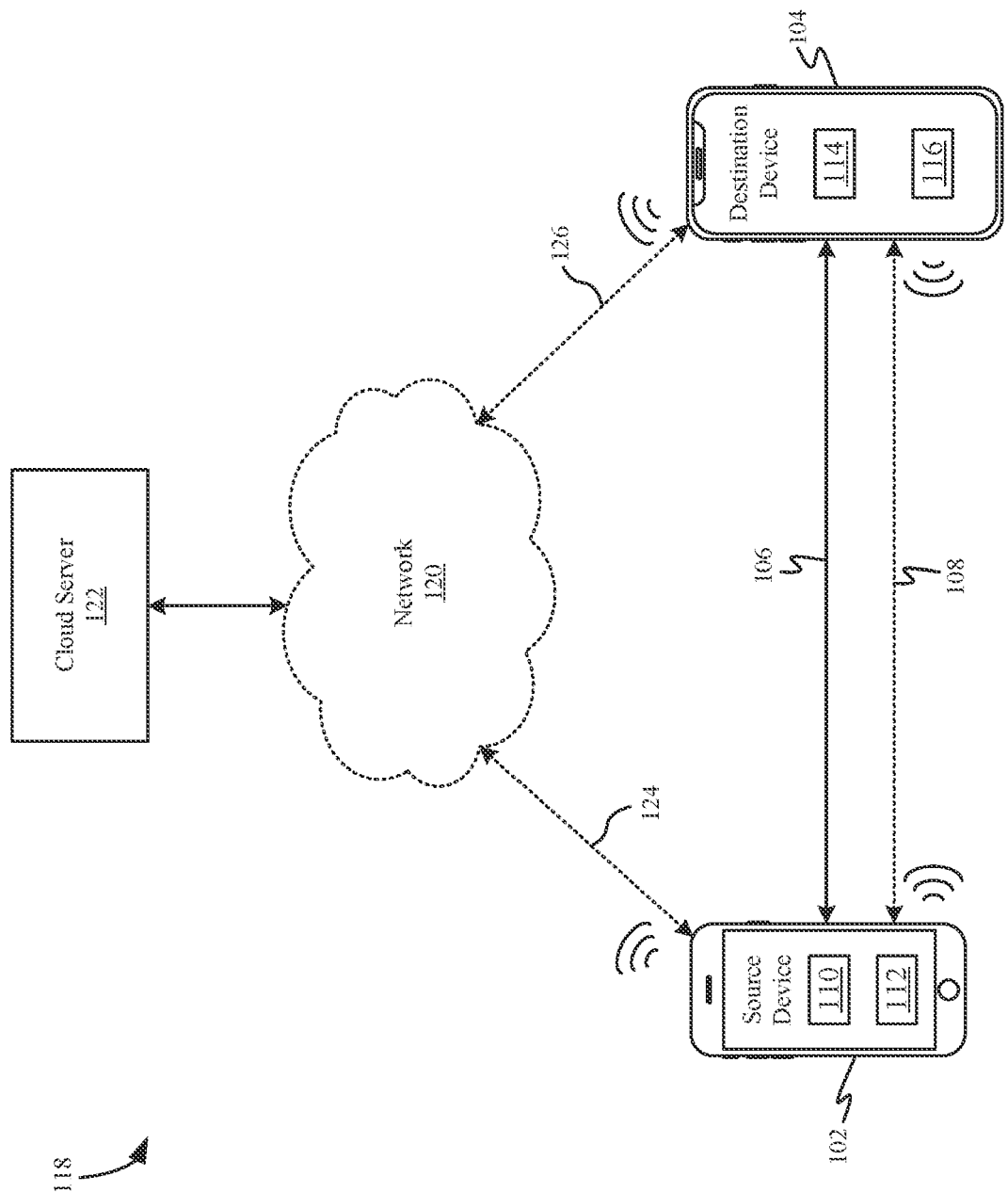

FIG. 1B illustrates a block diagram of another example system 118 for migrating data from source device 102 (e.g., old device) to destination device 104 (e.g., new device) for initial setup of destination device 104. In an example, source device 102 and destination device 104 may be configured to communicate via a network 120. In one approach, network 120 may be hosted by source device 102, by destination device 104, or by some other device or system. In another approach, network 120 may be used to migrate the data from source device 102 to destination device 104.

Any type of network 120 may be utilized, such as the Internet, wide area network (WAN), local area network (LAN), wireless local area network (WLAN), virtual private network (VPN), Bluetooth network, Bluetooth low energy (BTLE) network, peer-to-peer network, mobile broadband network, etc. Moreover, in an approach, more than one network may be used to connect source device 102 and destination device 104. Source device 102 and destination device 104 may be wirelessly coupled to network 120 via wireless connections 124, 126, respectively. Wireless connections 124, 126 may utilize any protocol known in the art to communicate through network 120 with the other device.

In one example, if an Internet or network connection is available to source device 102, then synchronization of any user data of source device 102 may be determined prior to choosing how and which data to migrate to destination device 104. Should some first user data be synchronized with cloud server 122, then the user may choose to not have the first user data transferred from source device to destination device 104, to save time and conserve processor workload and network bandwidth. In another example, source device 102 may automatically select to not have the first user data transferred from source device to destination device 104 when a network connection is available to conserve resources.

In addition to transferring data that is not synchronized with cloud server 122, the first user data may be downloaded and/or synchronized to destination device 104, thereby causing the first user data to be stored or synchronized to destination device 104 and available for use with any user applications, settings, preferences, etc. However, it is not necessary that an Internet or network connection be utilized to configure and setup destination device 104, as all necessary data may be obtained from source device 102 via the secure peer-to-peer connection(s) 106, 108.

In another example, a cloud server 122 may be used in the migration process. Cloud server 122 may, in an example, host a migration application that provides migration of the data from source device 102 to destination device 104. However, migration of the data that takes place without the need for Internet or network connectivity of source device 102 and destination device 104 may be preferred to allow the data migration even when a network 120 is unavailable or congested, in an approach. In addition, some data from source device 102 may be stored and/or backed-up on cloud server 122 prior to migration to destination device 104. For example, photos and videos that have been captured using source device 102 may be automatically backed-up to cloud server 122 and associated with a user account. This technique ensures that the user does not lose this content should the user lose or damage source device 102. Moreover, after the data migration and setup processes are performed, destination device 104 may be associated with the user account, providing the user with access to the content stored to cloud server 122 through destination device 104.

To enhance the user's privacy, any data that is sent to network 120 and/or cloud server 122 may be encrypted to ensure that unauthorized third parties are not able to obtain the data. Moreover, the user may requested to provide permission for any transmission of data to network 120 and/or cloud server 122 prior to such a transmission taking place, such as by showing a pop-up window or notification requesting the user's permission to send the data. Should the user not provide permission to send the data, the process may be suspended until a secure peer-to-peer connection is available.

Figure 2A:
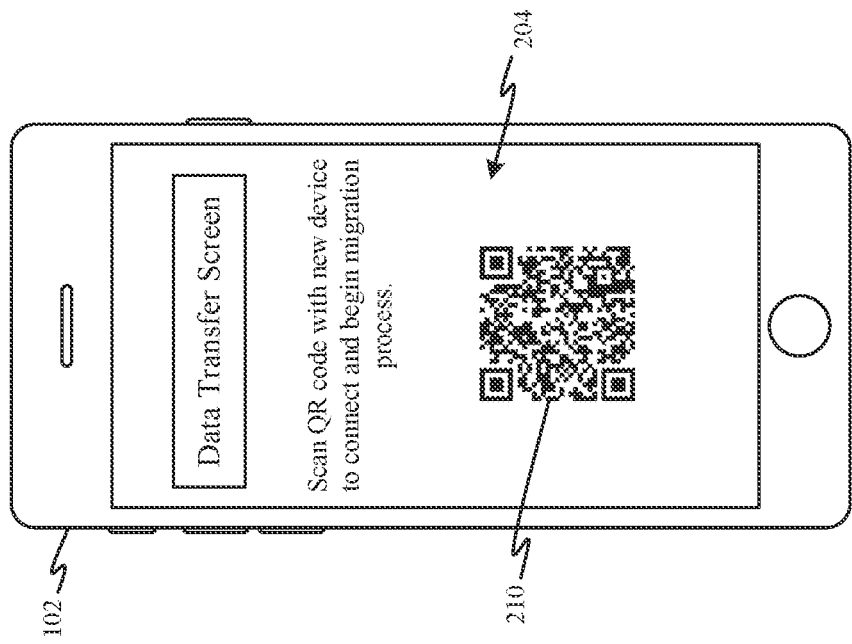
FIGS. 2A-2B show example user interfaces (UIs) that may be used to migrate data from a source device to a destination device.
Figure 2A:
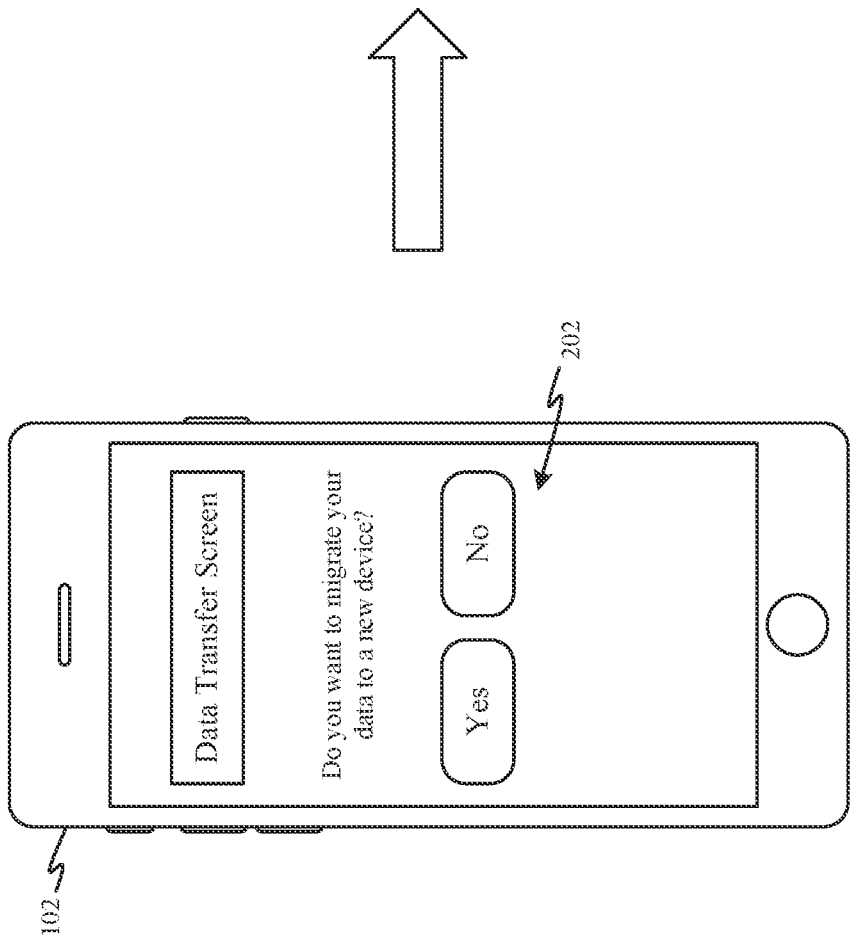
Figure 2B:
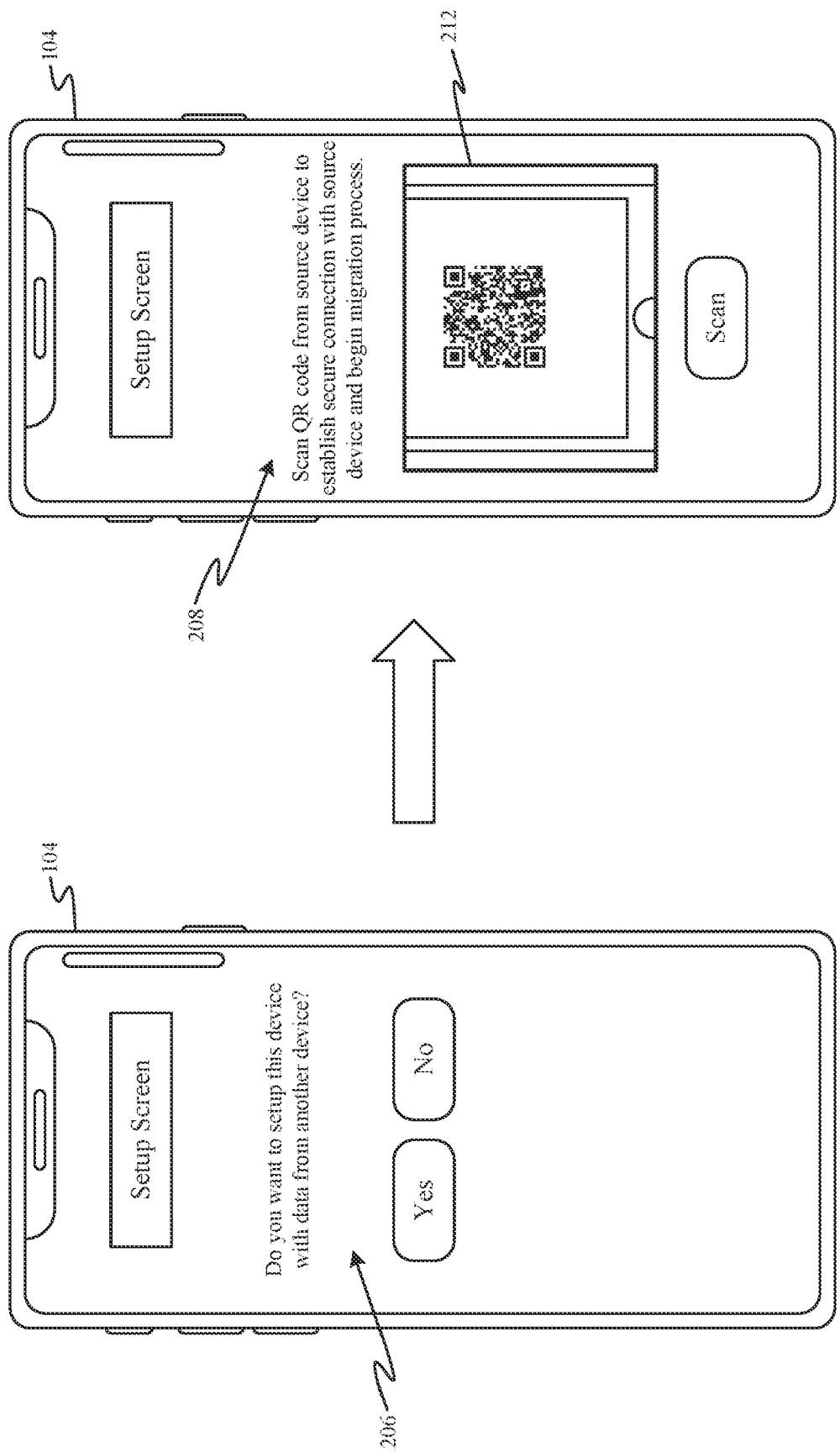

FIGS. 2A-2B show example user interfaces (UIs) that may be used to migrate data from a source device 102 to a destination device 104. In FIG. 2A, example data transfer screens 202, 204 are shown on source device 102. Data transfer screens 202, 204 may include text, graphics, video, images, and/or user interactive elements, such as buttons, toggles, sliders, radio buttons, etc. In one approach, a data migration process may be initialized or started from data transfer screen 202, such as by the user providing input to start the migration process by selecting a "Yes" button in response to being asked if the user wants to migrate data to destination device (e.g., the new device).

In one approach, a QR code 210 may be generated by source device 102 and presented on a data transfer screen 204 of source device 102 along with instructions for the user to scan the QR code 210 with an optical sensor (e.g., camera) of the destination device (e.g., new device). In another approach, a code may be presented on data transfer screen 204 of source device 102 along with instructions for the user to enter the code at an appropriate place on a setup screen of the destination device.

As will be appreciated, other forms of codes and/or pairing information (e.g., an alphanumeric code, barcodes, pairing images, etc.) may be generated by source device 102 or the destination device for purposes of establishing a secure connection (e.g., a private wireless network, NFC connection, BTLE connection, UWB connection, etc.) with the other device. In a further approach, the secure connection may be a secure peer-to-peer connection as described herein or of a type known in the art.

In response to the user performing the instructed action(s) (e.g., scanning the QR code 210, entering a code, scanning an image or series of images, etc.), source device 102 or the destination device may establish the secure peer-to-peer connection with the other device. In some embodiments, source device 102 may disconnect any existing wireless network connections prior to establishing the secure peer-to-peer connection. In some embodiments, source device 102 may serve as a wireless access point and function as a hotspot, such that a private wireless network hosted by source device 102 may be utilized for data exchange between source device 102 and the destination device.

Source device 102 may derive, based on the code entered or scanned at the destination device, a number of connection parameters associated with the secure peer-to-peer connection, such as a connection type, connection protocol(s), network name, also referred to as a service set identifier (SSID), pre-shared key(s) (or other shared secret information) used for encryption purposes, etc. In some embodiments, source device 102 may initiate a number of services associated with the secure peer-to-peer connection. For example, the services may include Dynamic Host Configuration Protocol (DHCP) for Internet Protocol (IP) address allocation, multicast Domain Name System (mDNS) for discovery of source device 102 and destination device 104, and/or other services known in the art for use in establishing and maintaining hardwired or wireless secure peer-to-peer connections.

In another example, a message or handshake exchange may take place between source and destination devices, which may include a series of keys and/or certificates (that offer an additional layer of security at transport layer) to ensure that any communication over the secure peer-to-peer connection will be performed securely and without data loss. In some embodiments, during the handshake exchange, the source device and destination device 104 may exchange basic information regarding capabilities of the devices (e.g., wireless protocol(s) supported, hardware features, information transfer rate, types of data to be migrated (e.g., photos, videos, etc.). Moreover, the source device and destination device 104 may negotiate an appropriate wireless protocol to be used for the data migration process based on the exchange.

In one approach, the QR code 210 may be generated in response to selection of the "Yes" button on the data transfer screen 202. In some embodiments, when the user selects the "Yes" button, source device 102 may perform one or more operations. The operations may include, in an example: 1) generating the code, 2) presenting the code on data transfer screen 202, 3) deriving parameters to provide the secure peer-to-peer connection, 4) establishing the secure peer-to-peer connection, and 5) initiating services associated with the secure peer-to-peer connection. At this point, source device 102 and the destination device are not in communication with one another via the secure peer-to-peer connection.

In FIG. 2B, example data transfer screens 206, 208 are shown on destination device 104. Data transfer screens 206, 208 may include text, graphics, video, images, and/or user interactive elements, such as buttons, toggles, sliders, radio buttons, etc. In one approach, a data migration process may be initialized or started from setup screen 206, such as by the user providing input to start the migration process by selecting a "Yes" button in response to being asked if the user wants to setup destination device 104 with data from the source device (e.g., another device).

In one approach, the QR code 210 may be scanned by the user using an optical sensor (e.g., a camera) of destination device 104 using scanning window 212. In another approach, a code may be presented on the source device to be input into a text box or some other appropriate place on a setup screen of destination device 104. As will be appreciated, other forms of codes and/or pairing information may be generated by the source device or destination device 104 for purposes of establishing a secure peer-to-peer connection with the other device.

In response to the user performing the instructed action(s) (e.g., scanning the QR code 210, entering a code, scanning an image or series of images, etc.), destination device 104 or the source device may establish the secure peer-to-peer connection with the other device. In some embodiments, destination device 104 may disconnect any existing wireless network connections prior to establishing the secure peer-to-peer connection. In some embodiments, destination device 104 may serve as a wireless access point and function as a hotspot, such that a private wireless network hosted by destination device 104 may be utilized for data exchange between destination device 104 and the source device. Destination device 104 may derive, based on the code entered or scanned at the destination device, a number of connection parameters associated with the connection type. In some embodiments, destination device 104 may initiate a number of services associated with the secure peer-to-peer connection.

In one approach, the scanning window 212 may be provided on setup screen 208 in response to selection of the "Yes" button on the setup screen 206. In some embodiments, when the user selects the "Yes" button, destination device 104 may perform one or more operations. The operations may include, in an example: 1) providing the scanning window 212 or text box for code entry, 2) deriving parameters to provide the secure peer-to-peer connection, 3) establishing the secure peer-to-peer connection, and 4) initiating services associated with the secure peer-to-peer connection. At this point, destination device 104 and the source device are not in communication with one another via the secure peer-to-peer connection.

In one approach, once the QR code 210 is scanned and verified by destination device 104, the setup screen 208 may display instructions that explain operations to be carried out by the user at destination device 104. The operations may include, in an example: 1) access an online application store, 2) download a migration application that facilitates the migration of data from source device to the destination device 104, and 3) open or start the migration application.

In another approach, the migration application may be included with the first and/or second OS, such that steps 1 and 2 above do not need to be performed to start the migration application. In some embodiments, the migration application may be provided by a manufacturer of the source device or destination device 104.

Once the user initiates the data migration process, either from the source device or destination device 104, in an approach, no further input is necessary from the user to cause all data to be migrated to destination device 104.

Figure 3:
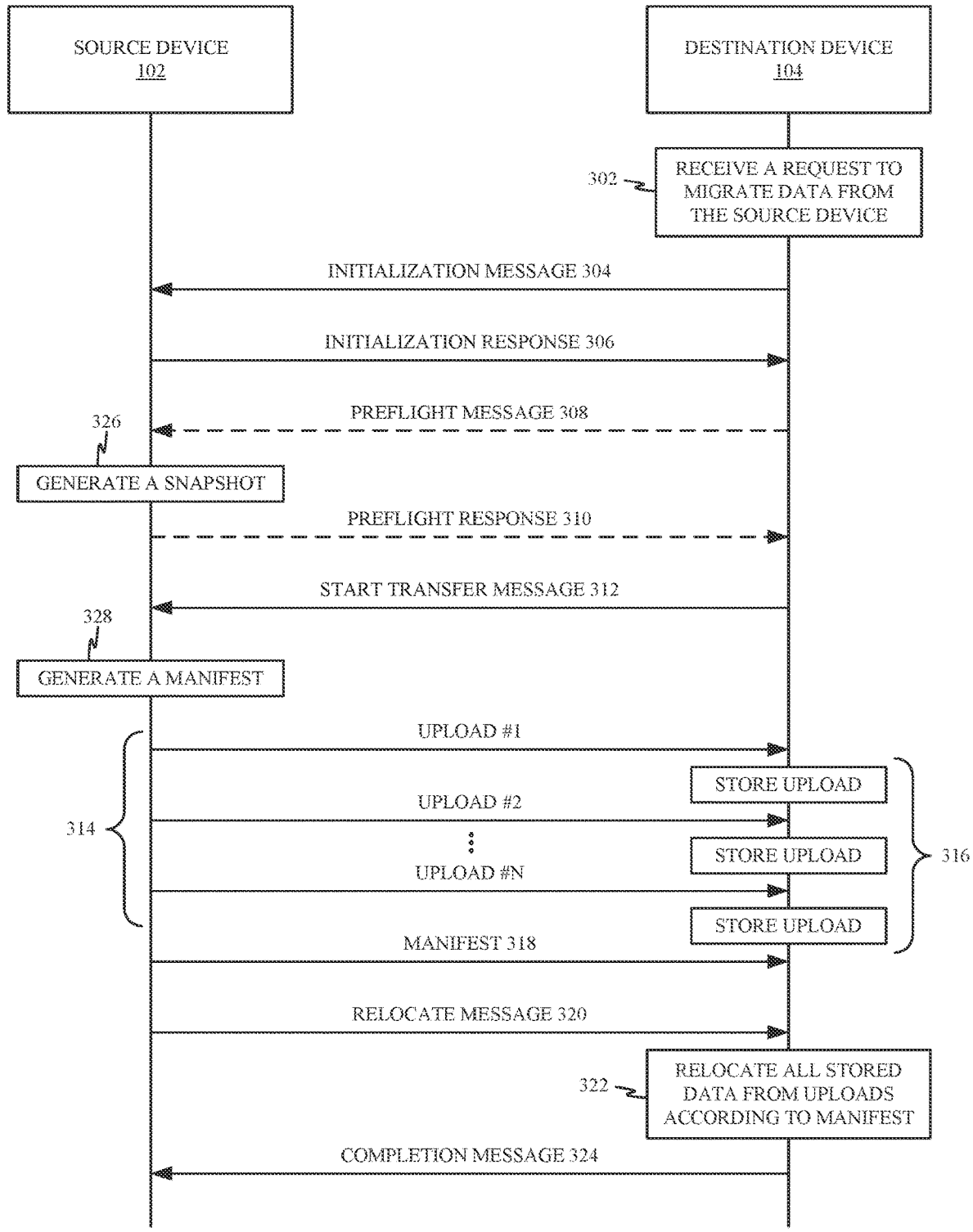
FIG. 3 shows an example system interaction diagram for migrating data from a source device to a destination device.

FIG. 3 shows an example system interaction diagram for migrating data from a source device to a destination device. The interactions between source device 102 and destination device 104 may be performed in response to a secure peer-to-peer connection being established between source device 102 and destination device 104. In an approach, destination device 104 may receive a request 302 to migrate data from source device 102 via the peer-to-peer connection. This request 302 may be received by user input to a UI displayed to destination device 104 in one example. In another example, the request 302 may be sent from source device 102 to destination device 104 in response to user input to source device 102 indicating a desire to migrate data to destination device 104.

In one example, all user data may be transferred from the user's old smartphone to the user's new smartphone. This transfer may take place at the place of purchase of the new smartphone (e.g., mobile telephone store, kiosk, etc.), at home, or any place desired by the user where the old smartphone and new smartphone are in proximity with one another and under the user's control. Moreover, system files and OS specific data may remain on the old smartphone and not be transferred to the new smartphone, since such files and data may be unusable by the OS of the new smartphone, and/or would not be needed to reconstruct the look and feel of the old smartphone.

In an approach, destination device 104 may send an initialization message 304 to source device 102. The initialization message 304 may include any information that is useful in prompting the receiving device to prepare for a data migration and identify the sending device to ensure that it is authorized to receive the data transfer. In one approach, initialization message 304 may include device details about destination device 104, such as a device ID, OS type and version, class or type of the device (e.g., smartphone, tablet, laptop, etc.), device model (specific manufacturer and model number of the device), marketing name of the device, data classification to check for compatibility, etc.

In this approach, source device 102 may review all of the information provided by destination device 104 to ensure that a data transfer will be successful and is authorized to go forward, based on compatibility with OS, data class, formats, and file structures of destination device 104. When the review is positive, source device 102 may respond to the initialization message 304 with an initialization response 306. The initialization response 306 may acknowledge receipt of the initialization message 304 and indicate device information for source device 102.

According to another approach, the initialization message 304 may be sent from source device 102 to destination device 104, and the initialization response 306 may be sent from destination device 104 to source device 102. The information included in each message will be particular to the device which sends the message/response.

In response to receiving the initialization response 306, destination device 104 may send a preflight message 308 to source device 102. The preflight message 308 may include information specific to the data transfer as known by destination device 104 and the capabilities of the destination device 104, such as an amount of available memory on destination device 104, a manifest describing a file format and structure for destination device 104, etc.

According to an approach, in response to receiving the initialization message 304 and/or the preflight message 308, source device 102 may generate, in operation 326, a snapshot of the full file system of source device 102 which includes all data that is stored to source device 102 at a time that the snapshot is taken. For example, the snapshot may record an image of the file system of source device 102 that shows the existence of every file on source device 102 and indicates contents of each file. The image may, in one example, include a serialized copy of the entire state of source device 102 stored in a non-volatile form, such as a file. Destination device 104 may utilize the image to reconstruct the system of source device 102 by shutting down and rebooting to exactly the same state as source device 102. Any method known in the art may be used to create the snapshot as would be understood by one of skill in the art.

Once the snapshot is generated at source device 102, in an approach, source device 102 may be locked to ensure that no further changes are made to data on the device prior to being transferred to destination device 104. In approaches where source device 102 is not locked, incremental snapshots that indicate modified content that occurred after the snapshot was generated may be made to account for any changes that occur post-snapshot.

In another approach, in response to receiving the initialization message 304 and/or the preflight message 308, source device 102 may prepare a manifest that describes a set of data stored to source device 102 that will be transferred to destination device 104, along with locations associated with the set of data to be used in moving the set of data to its corresponding storage location after it is received on destination device 104. In one implementation, the set of data may include all user data based on the snapshot, and may exclude files and data that are specific to the first OS operating on source device 102 and other data that is unrelated to the user's interactions with source device 102. There are many reasons why only user data is transferred to destination device 104. Some reasons include that the excluded system data may not be applicable to the second OS operating on destination device 104, may be unreadable by destination device 104, may represent files and data that would be duplicated on destination device 104, etc. Therefore, to avoid these situations and the unnecessary use of bandwidth and processing capacity to move the system files, they are excluded from the set of data transferred to destination device in this approach.

Source device 102, upon receiving the preflight message 308, may respond with a preflight response 310. The preflight response 310 may include information specific to the data transfer as known by source device 102 along with capabilities of the source device 102, such as a number of files that will be transferred to destination device 104, a total number of settings and/or preferences that will be transferred to destination device 104, which aspects of the device the settings and/or preferences apply to, etc. This information may be used to determine progress of the data transfer by destination device 104 once the data begins to be transferred.

According to another approach, the preflight message 308 may be sent from source device 102 to destination device 104, and the preflight response 310 may be sent from destination device 104 to source device 102. The information included in each message will be particular to the device which sends the message/response.

Upon receiving the preflight response 310, in one approach, source device 102 may begin transferring data in a series of packages or uploads (e.g., upload #1, upload #2, . . . upload #n, collectively 314) until all the data from the manifest is transferred to destination device 104. In this approach, upon receipt of each upload 314, destination device may store 316 the data within the particular upload to a staging area or backup store.

According to some embodiments, the data migration of the successive uploads 314 from source device 102 to destination device 104 may be fault-tolerant. In other words, if the secure peer-to-peer connection is lost or one of the devices loses power (due to reboot or other reasons), the data migration process is only temporarily interrupted and may be resumed as soon as the secure peer-to-peer connection or device power is restored. In some implementations, a status of the data migration process may be maintained on source device 102, on destination device 104, or on both. The device that maintains the status of the migration process may keep a record of a particular state in the data migration process. The particular state may include information regarding the operation that was interrupted (e.g., upload #2, upload #n, transfer of manifest, etc.) that was being performed when the connection or device power was lost, an amount of data (e.g., bytes of data, upload number in the sequence, a number of records transferred) that was migrated or transferred prior to losing the connection or device power.

In some embodiments, the data migration may be paused and resumed as desired by a user without affecting the consistency of the migration process. In some embodiments, source device 102 and destination device 104 may be usable while the data migration process is being carried out. Also, because the data migration occurs over the secure peer-to-peer connection, which may be hosted by source or destination device and is not dependent on an external network environment the devices are in, the devices may continue the data migration process (so long as the secure peer-to-peer connection between the devices remains intact). For example, if a user is at a retail store where the data migration process is started over the secure peer-to-peer connection, the user can walk out of the retail store with the two devices without interrupting the data migration process as the process does not rely on any third-party network (e.g., retail store wi-fi network).

In some embodiments, when an existing secure peer-to-peer connection between source device 102 and destination device 104 is disconnected during the data migration process and the user attempts to restart the data migration process, a different secure peer-to-peer connection may be established based on a new authentication exchange (e.g., code, image, etc.) generated at the initiating device. The other device may derive the connection parameters associated with establishing the new secure peer-to-peer connection. When source and destination devices discover one another, they are able to identify one another (e.g., based on unique identifiers), and the data migration process may be resumed from a point where the previous secure peer-to-peer connection was disconnected/terminated.

In an approach, source device may send the manifest 318 to destination device 104 for use in relocating the stored data from the staging area/backup store to corresponding locations indicated in the manifest. The manifest may be sent at any time after it is generated in operation 328, such as being sent with or just after the preflight response 310, being sent before or after one of the uploads 314, or being sent once all data has been transferred from source device 102 to destination device 104.

Optionally, after the manifest 318 is sent, source device 102 may prompt destination device 104 to begin processing the transferred data and/or metadata associated with the transferred data by sending a relocate message 320 indicating that no further data will be sent from source device 102. This information may prompt destination device 104 to reboot, and then begin unpackaging, decompressing, decrypting, analyzing, and/or relocating the transferred data and/or metadata associated with the transferred data it has already received. In one approach, when the manifest 318 is sent after all the data uploads 314 are complete, the transmission of the manifest 318 may signal the end of data transmission, in which case the relocate message 320 is unneeded.

In one approach, the set of data transferred to destination device 104 may be compressed on source device 102 prior to being transferred. Once it is uploaded to destination device 104, a decompression process may be performed to the transferred data to decompress it for use on destination device 104. Any compression algorithm known in the art may be used by source device 102, while any corresponding decompression algorithm known in the art may be used by destination device 104 to compress/decompress the set of data. This process of compression/decompression reduces processor and bandwidth requirements to perform the data transfer.

In operation 322, destination device reboots, then after rebooting it relocates the stored data and/or metadata associated with the stored data to corresponding locations specified by the manifest. Moreover, if the data was sent distributed across several packages and/or encrypted, destination device 104 may process the received data to reassemble the packages and/or decrypt the data prior to relocating the data to its corresponding location on destination device 104.

In one approach, the transferred data may be cloned on destination device 104 to its corresponding locations by moving and/or copying metadata associated with the transferred data to the corresponding locations specified by the manifest, while maintaining a storage location of the data itself. This process of cloning reduces processor cycles used, and expedites setup of destination device 104 for faster utilization by the user.

Once all data has been processed by destination device 104, it may send a completion message 324 to source device 102 indicating that the process has ended. Moreover, this completion message 324 may prompt one or both devices to terminate the secure peer-to-peer connection therebetween.

In an example, any user accounts that the user had established with or accessed with source device 102 may be automatically re-established on destination device 104, so that the user may enjoy all the features and functionality afforded to the user through use of the specific user accounts. Any number of user account(s) may be used in this fashion, and may include accounts for online music streaming services, online backup services, online video streaming services, online storage services, etc. The re-establishment of the user account(s) may provide destination device 104 with access to data stored online in an approach. Moreover, this data that is accessible online may be removed from the data transferred to destination device 104 from source device 102 in anticipation of later gaining this access through the user account(s) being established on destination device 104 automatically.

In response to the completion message 324 being received by source device 102, a selectable notification may be presented on source device 102 asking the user if the device should be wiped and/or all user data deleted and returned to a default state. If the user selects the notification and chooses to wipe source device 102, a removal process may be started to return source device 102 to a default state and remove all user data.

In one approach, this removal process that returns source device 102 to the default state that removes all user data may be performed automatically once the completion message 324 is received on source device 102. In a further approach, the user may be asked whether to wipe source device 102 after completing the migration process at a start of the migration process, and will proceed according to the user's previous instructions received at the beginning of the migration process.

Optionally, once all data has been unpackaged, decompressed, decrypted, analyzed, and/or relocated as described by the manifest, destination device 104 may be rebooted again to a lock screen for the user to enter credentials to login to the destination device which has been setup to have all the user data, settings, preferences, etc., of source device 102.

Figure 4:
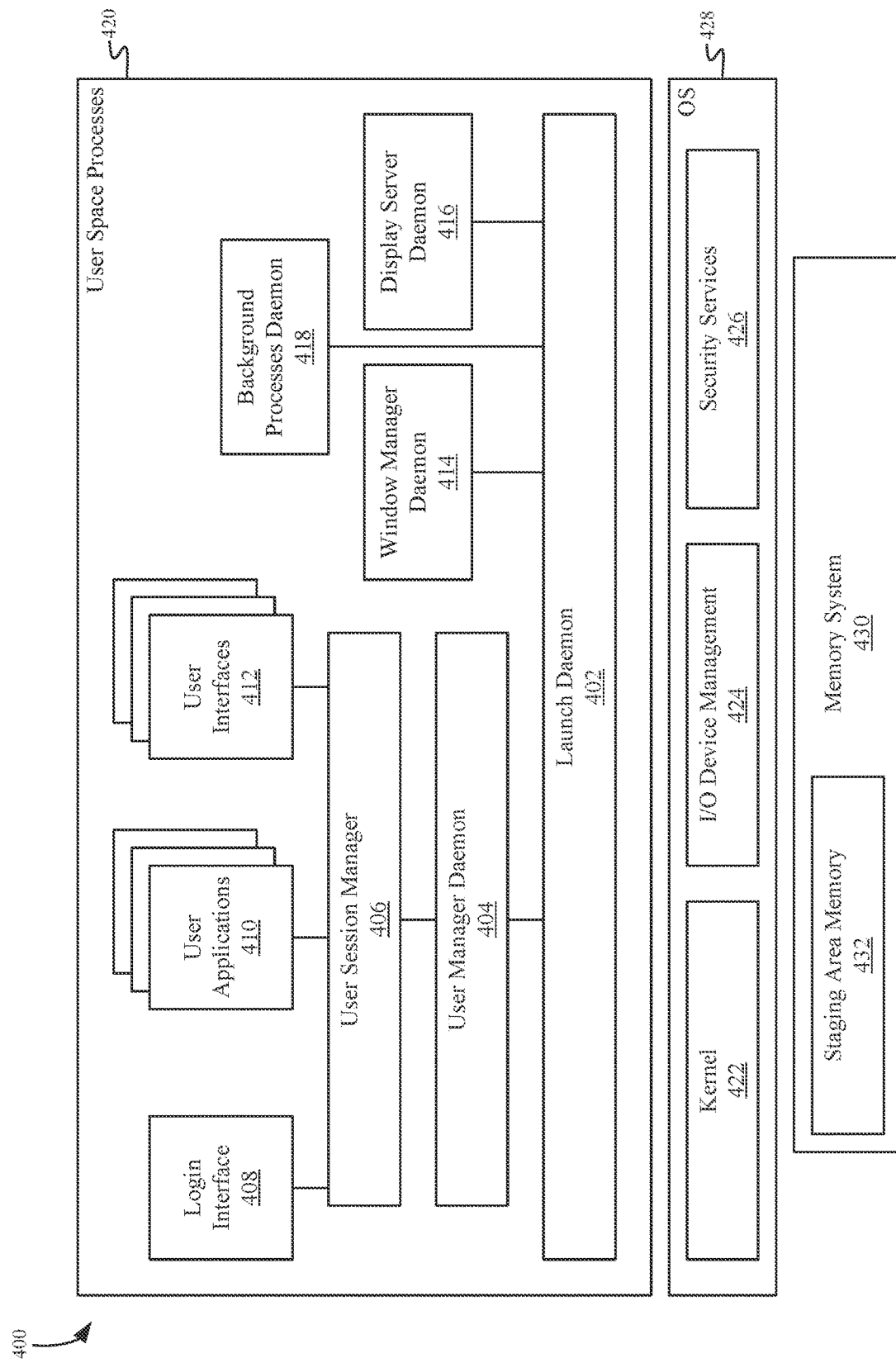
FIG. 4 shows an example system for providing a second reboot without user interaction.

FIG. 4 shows an example system 400 for providing a second reboot without user interaction. The second reboot may be possible by stopping all daemons operating on the destination device except for one or more essential daemons that keep the kernel running 422, then restarting all the other non-essential daemons with the new configuration specified by the manifest and current state of source device. Many times an OS may restrict a process (such as the data migration process) to only rebooting after receiving user interaction. However, in the present descriptions, two reboots are used. This second reboot is provided as a software reboot that strips down all non-essential processes while keeping the kernel running.

This technique for providing a second reboot does not require the user to login to the device until the full migration process has completed and the device is ready to be used again. Because the initial transfer of data from the source device to the destination device may take place over a first period of time, while the relocating of the data once transferred to the destination device may take place over a second time period, it is undesirable for the user to be required to interact with the destination device before transitioning from uploading the data to relocating the data.

Example system 400 shows user space processes 420 that are operated above the OS level 428. The kernel 422 is maintained in the OS level 428 during the second reboot, but any non-essential daemons, processes, or services from the user space processes 420 are terminated to allow the migrated data to be configured appropriately. For example, user manager daemon 404, window manager daemon 414, display serve daemon 416, and background processes daemon 418 may all be terminated during the second reboot. Moreover, any secondary process that relies on a terminated daemon, such as the user session manager 406 may also be terminated, along with any applications managed by a terminated secondary process, such as the login interface 408, user interfaces 412, and user applications 410.

According to an example, some OS level 428 processes may continue and some may be terminated when performing the second reboot. In this example, I/O device management 424 may be terminated during the second reboot, while security services 426 may remain running to provide security and privacy services for the destination device.

Moreover, access to the staging area memory 432 will remain unaffected by the second reboot in an example, while access to some other areas of the memory system 430 may be suspended due to termination of one or more processes, daemons, or services in the OS level 428.

In an example, if two game applications and their associated data (e.g., last saved position in the game, equipment collected, special maps, etc.) are transferred from the source device to the destination device, then the user manager daemon 404 would be terminated on the destination device so that the applications and associated data may be loaded and configured to operate as they did on the source device. After the second reboot, the user manager daemon 404 would be restarted and these game applications would be ready to be played by the user from the same place that they were last played on the source device.

In another example, if a custom desktop is used on the source device, then after migrating over the data for this custom desktop to the destination device, the user interface process 412 would be terminated along with the user manager daemon to allow for the custom desktop to be installed on the destination device. After the second reboot, the user manager daemon 404 would be restarted and the destination device would be operable using the custom desktop just like on the source device.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 5:
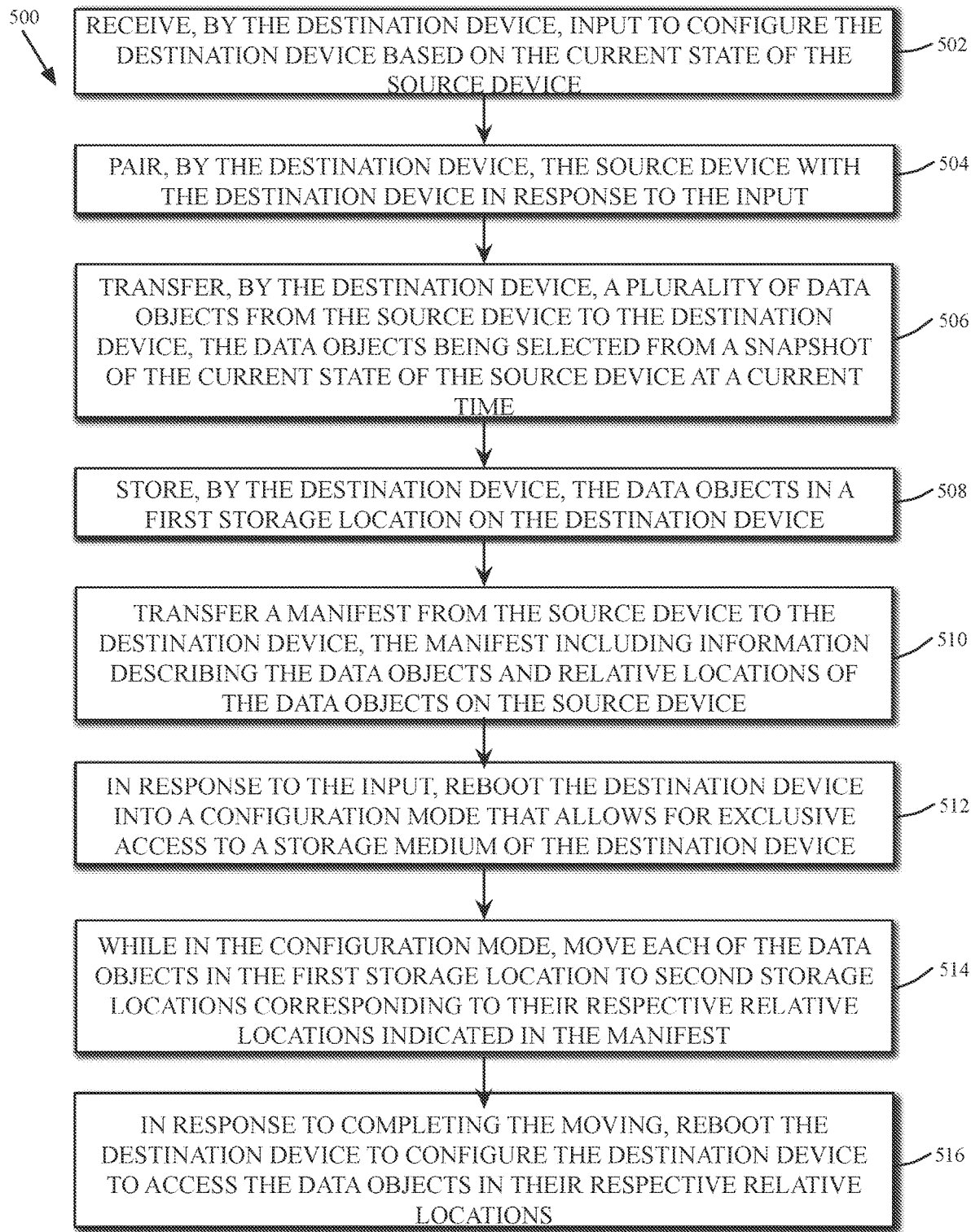
FIG. 5 is a flow diagram of an example process for configuring a destination device based on a current state of a source device using a peer-to-peer connection.

FIG. 5 is a flow diagram of an example method 500 for configuring a destination device based on a current state of a source device using a peer-to-peer connection. In operation 502, the destination device may receive input to configure the destination device based on a current state of the source device. The current state of the source device may be determined based on a snapshot taken by the source device at a particular point in time.

The input may specify that the user desires for the destination device to be set up according to how the source device is currently operating, e.g., settings, preferences, applications installed, data and files stored to memory, etc. This input may be received via a UI displayed by the destination device, in one approach. Moreover, the input may be touch input received via a touchscreen, voice input received via a microphone, motion input received via a motion capture device, or some other known input device known in the art, such as keyboard, mouse, etc.

In operation 504, the destination device may pair the source device with the destination device in response to the input. This pairing establishes a secure peer-to-peer connection as described herein, for transferring data from the source device to the destination device and exchanging messages therebetween.

The secure peer-to-peer connection may be established using any technique described herein and others known in the art, such as entry of a code, display of an image, series of images, barcode, UPC, QR code, etc., on one device and capturing this information using the other device, etc.

In several approaches, the destination device may be connected to the source device, prior to transferring data objects, via a Wi-Fi peer-to-peer connection, via a physical wired connection, or via a direct connection.

In operation 506, the destination device may transfer (e.g., pull) a plurality of data objects from the source device to be stored to the destination device. The destination device effectively pulls the data objects from the source device without the source device being involved in the transfer operation, e.g., requesting specific data objects for transfer, accessing memory of the source device and copying data objects therefrom, or some other known way of pulling data from another device. In another approach, source device may transfer (e.g., push) the data objects to the destination device.

In one approach, destination device may determine whether there is sufficient available memory on the destination device prior to beginning the transfer. Otherwise, method 500 may end without any data being transferred.

The data objects are selected from the snapshot of the current state of the source device at a current point in time when the snapshot is taken. Data objects may include files, settings, preferences, images, photos, videos, messages, account information, and any other user data stored to the source device.

In one approach, system and OS-specific data may be excluded from the data objects selected from the snapshot. In this approach, the data objects may include settings, preferences, configurations, photos, music, videos, messages, applications, and other user data. In one approach, user data may include financial information, like particular online and electronic payment methods and information that may be used to purchase goods and services using source device 102. In addition, system files of the source device may be excluded from the data objects.

In operation 508, the destination device may store the data objects in a first storage location on the destination device. This first storage location may be a staging area or backup store configured to temporarily store data for further processing.

In operation 510, the destination device may transfer (e.g., pull) a manifest from the source device to be stored to the destination device. The manifest includes information describing the data objects and relative locations of the data objects on the source device for use in relocating the data objects to corresponding storage locations once stored to the first storage location on the destination device. In one approach, the manifest may include indication of a total number of the data objects that will be transferred from the source device to the destination device.

In operation 512, the destination device may be rebooted into a configuration mode in response to the input to configure the destination device. The configuration mode allows for exclusive access to a storage medium of the destination device, such as the first storage location. The configuration mode is entered after rebooting the destination device, without user interaction causing the destination device to reboot or enter the configuration mode.

In operation 514, while in the configuration mode, the destination device may move each of the data objects in the first storage location to second storage locations corresponding to their respective relative locations indicated in the manifest. The movement of the data objects may take place because in configuration mode, the process executing the movement commands has exclusive access to memory of the destination device.

In operation 516, the destination device may reboot in response to completing moving the data objects to the second locations. This allows for the destination device to be configured to access the data objects in their respective relative locations. This second reboot may also take place without user interaction, such as logging in, providing credentials, etc., thereby making the whole migration process seamless for the user with only the first interaction being needed to start the process.

In an approach, method 500 may include determining, by the destination device, whether an OS update is available for the destination device. For example, the OS may have a security patch, feature enhancement, or some other update that has not been performed but is available for the user. In response to determining that the update is available, the destination device may update the first OS of the destination device prior to transferring the data objects.

In one implementation, method 500 may include establishing, by the destination device, a synchronization process between a remote or cloud storage and at least some of the data objects that were previously synchronized with the remote or cloud storage on the source device. In this implementation, after transferring over the data objects that were synchronized with the remote or cloud storage, the automatic backup to the remote or cloud storage may be re-established to ensure that any changes to the synchronized data objects will be captured in the back-up location.

According to an example, method 500 may include determining, by the destination device, a size of the data objects. This size is a measurement of how much storage space is required to store the data objects on the destination device. Further, method 500 may include determining, by the destination device, whether an amount of available storage on the destination device is sufficient to store the data objects to the destination device. In this example, the destination device may transfer the data objects from the source device in response to a determination that the amount of available storage on the destination device is sufficient to store the data objects to the destination device, and the destination device may not transfer any data from the source device in response to a determination that the amount of available storage on the destination device is insufficient to store the data objects.

Figure 6:
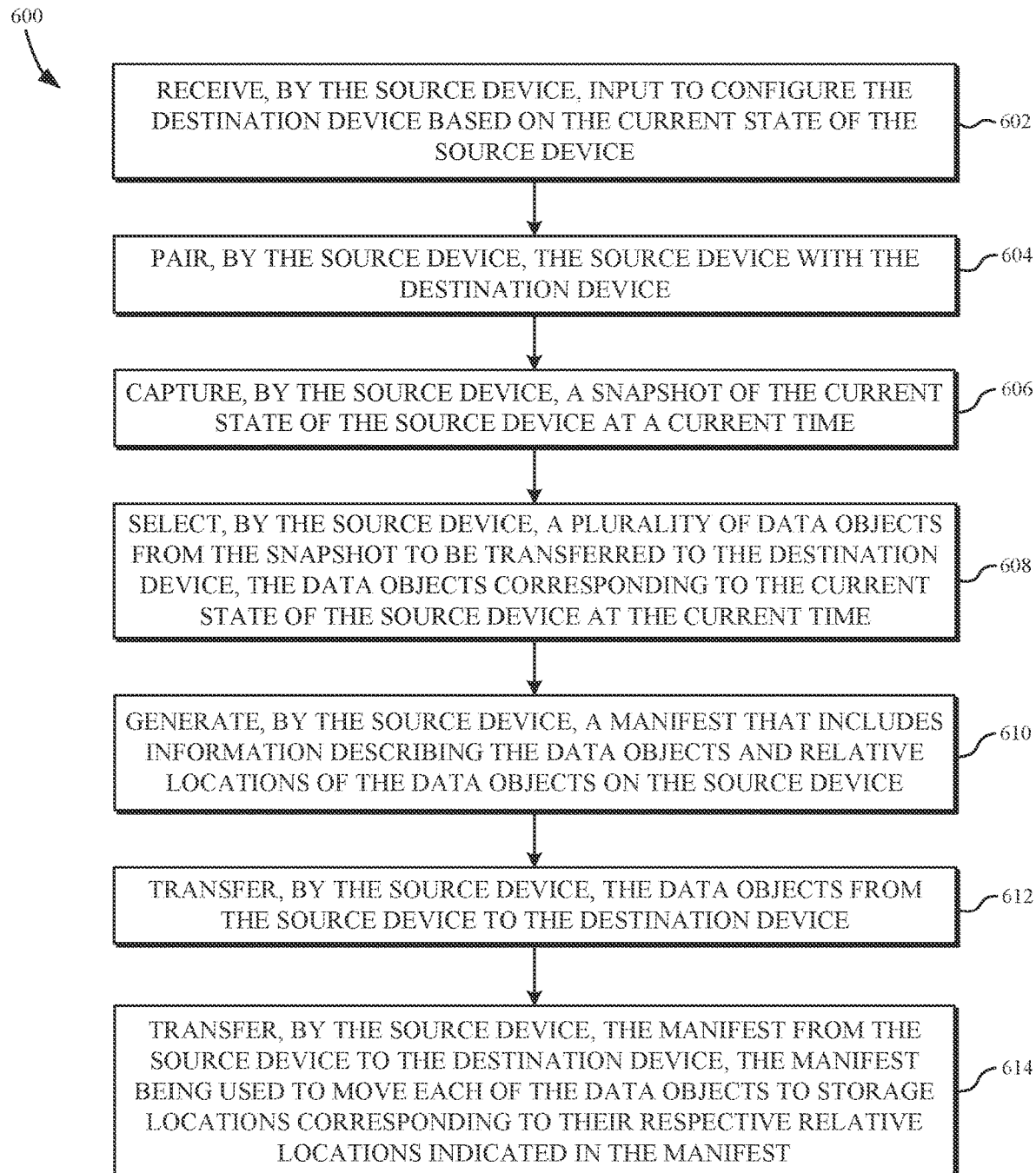
FIG. 6 is a flow diagram of an example process for configuring a destination device based on a current state of a source device using a peer-to-peer connection.

FIG. 6 is a flow diagram of an example method 600 for configuring a destination device based on a current state of a source device using a peer-to-peer connection. In operation 602, the source device may receive input to configure the destination device based on a current state of the source device. The current state of the source device may be determined based on a snapshot taken by the source device at a particular point in time.

The input may specify that the user desires for the destination device to be set up according to how the source device is currently operating, e.g., settings, preferences, applications installed, data and files stored to memory, etc. This input may be received via a UI displayed by the source device, in one approach. Moreover, the input may be touch input received via a touchscreen, voice input received via a microphone, motion input received via a motion capture device, or some other known input device known in the art, such as keyboard, mouse, etc.

In operation 604, the source device may pair with the destination device in response to the input. This pairing establishes a secure peer-to-peer connection as described herein, for transferring data from the source device to the destination device and exchanging messages therebetween.

The secure peer-to-peer connection may be established using any technique described herein and others known in the art, such as entry of a code, display of an image, series of images, barcode, UPC, QR code, etc., on one device and capturing this information using the other device, etc. In several approaches, the source device may be connected to the destination device, prior to transferring data objects, via a Wi-Fi peer-to-peer connection, via a physical wired connection, or via a direct connection.

In operation 606, the source device may capture a snapshot of the current state of the source device at a current point in time. Any snapshot technique known in the art may be used by the source device.

In one approach, the source device may be locked after capturing the snapshot to prevent user interaction with the source device. In this approach, the source device may remain locked until the data objects are transferred to the destination device.

In operation 608, the source device may select a plurality of data objects from the snapshot to be transferred to the destination device. The selected data objects correspond to the current state of the source device at the current time, and may include all user data on the source device. Moreover, in an example, data objects may include files, settings, preferences, images, photos, videos, messages, account information, and any other user data stored to the source device.

In one approach, system and OS-specific data may be excluded from the data objects selected from the snapshot. In this approach, the data objects may include settings, preferences, configurations, photos, music, videos, messages, applications, and other user data. In addition, system files of the source device may be excluded from the data objects.

In operation 610, a manifest may be generated by the source device. The manifest includes information describing the data objects and relative locations of the data objects on the source device for use in relocating the data objects to corresponding storage locations once stored to the destination device. In one approach, the manifest may include indication of a total number of the data objects that will be transferred from the source device to the destination device.

In an approach, the source device may determine a total number of the data objects, and this number may be stored to the manifest. In this way, the destination device may be able to track a progress of the data transfer using the total number of data objects to be transferred, and be able to determine when the transfer is complete.

In operation 612, the source device may transfer (e.g., push) the data objects from the source device to the destination device. In another approach, the destination device may transfer (e.g., pull) the data objects from the source device to be stored to the destination device.

In one approach, source device may determine whether there is sufficient available memory on the destination device prior to beginning the transfer. Otherwise, method 600 may end without any data being transferred.

In operation 614, the source device may transfer the manifest from the source device to the destination device. The manifest may be used by the destination device to know where to move each of the data objects after being stored initially to a staging area or backup store in order to reproduce the environment of the source device, e.g., to relocate each data object to storage locations corresponding to their respective relative locations indicated in the manifest.

In an approach, method 600 may include the source device determining whether an OS update is available for the destination device. For example, the OS may have a security patch, feature enhancement, or some other update that has not been performed but is available for the user. In response to determining that the update is available, the destination device may be requested to update the first OS of the destination device prior to transferring the data objects.

In one implementation, method 600 may include the source device providing indication to the destination device of at least some of the data objects that were previously synchronized with a remote or cloud storage on the source device. In this way, the destination device may establish a synchronization process between the remote or cloud storage and the data objects that were previously synchronized with the remote or cloud storage on the source device after the transfer.

In another approach, the source device may compress the data objects prior to transferring the data objects to the destination device, using any known compression algorithm.

According to an example, method 600 may include determining, by the source device, a size of the data objects. This size is a measurement of how much storage space is required to store the data objects on the destination device. Further, method 600 may include determining, by the source device, whether an amount of available storage on the destination device is sufficient to store the data objects to the destination device. In this example, the source device may transfer the data objects to the destination device in response to a determination that the amount of available storage on the destination device is sufficient to store the data objects to the destination device, and the source device may not transfer any data to the destination device in response to a determination that the amount of available storage on the destination device is insufficient to store the data objects.

Figure 7:
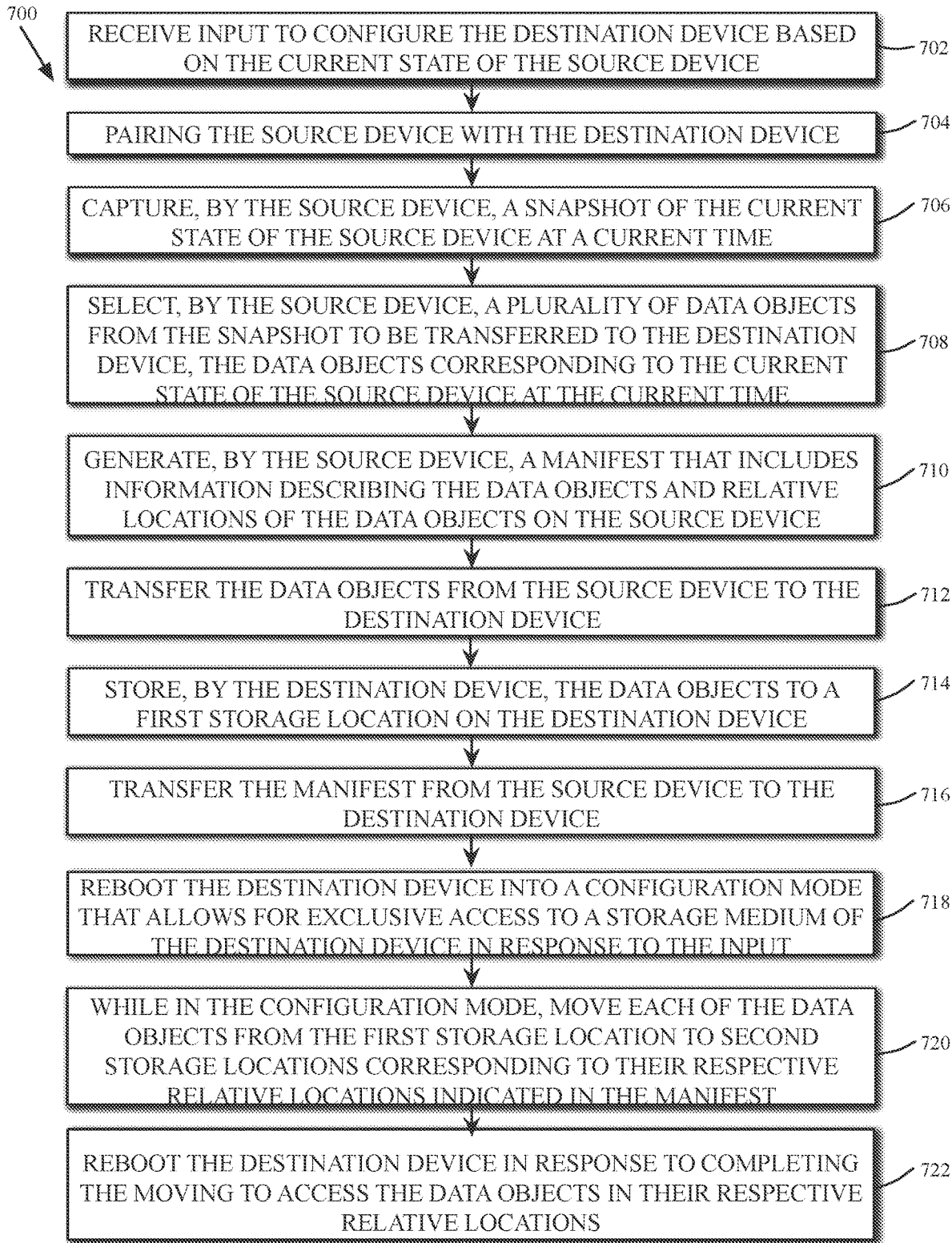
FIG. 7 is a flow diagram of an example process for configuring a destination device based on a current state of a source device using a peer-to-peer connection.

FIG. 7 is a flow diagram of an example method 700 for configuring a destination device based on a current state of a source device using a peer-to-peer connection. In operation 702, input is received to configure the destination device based on a current state of the source device. The current state of the source device may be determined based on a snapshot taken by the source device at a particular point in time.

The input may specify that the user desires for the destination device to be set up according to how the source device is currently operating, e.g., settings, preferences, applications installed, data and files stored to memory, etc. This input may be received via a UI displayed by the source or destination device, in one approach. Moreover, the input may be touch input received via a touchscreen, voice input received via a microphone, motion input received via a motion capture device, or some other known input device known in the art, such as keyboard, mouse, etc.

In operation 704, the source device and the destination device may be paired in response to the input. This pairing establishes a secure peer-to-peer connection as described herein, for transferring data from the source device to the destination device and exchanging messages therebetween.

The secure peer-to-peer connection may be established using any technique described herein and others known in the art, such as entry of a code, display of an image, series of images, barcode, UPC, QR code, etc., on one device and capturing this information using the other device, etc. In several approaches, the source device may be connected to the destination device, prior to transferring data objects, via a Wi-Fi peer-to-peer connection, via a physical wired connection, or via a direct connection.

In operation 706, the source device may capture a snapshot of the current state of the source device at a current point in time. Any snapshot technique known in the art may be used by the source device.

In one approach, the source device may be locked after capturing the snapshot to prevent user interaction with the source device. In this approach, the source device may remain locked until the data objects are transferred to the destination device.

In operation 708, the source device may select a plurality of data objects from the snapshot to be transferred to the destination device. The selected data objects correspond to the current state of the source device at the current time, and may include all user data on the source device. Moreover, in an example, data objects may include files, settings, preferences, images, photos, videos, messages, account information, and any other user data stored to the source device.

In one approach, system and OS-specific data may be excluded from the data objects selected from the snapshot. In this approach, the data objects may include settings, preferences, configurations, photos, music, videos, messages, applications, and other user data. In addition, system files of the source device may be excluded from the data objects.

In operation 710, a manifest may be generated by the source device. The manifest includes information describing the data objects and relative locations of the data objects on the source device for use in relocating the data objects to corresponding storage locations once stored to the destination device. In one approach, the manifest may include indication of a total number of the data objects that will be transferred from the source device to the destination device.

In an approach, the source device may determine a total number of the data objects, and this number may be stored to the manifest. In this way, the destination device may be able to track a progress of the data transfer using the total number of data objects to be transferred, and be able to determine when the transfer is complete.

In operation 712, the data objects may be transferred to the destination device, using a pull operation, a push operation, or a combination of pushing from the source device and pulling from the destination device.

In one approach, source device may determine whether there is sufficient available memory on the destination device prior to beginning the transfer. Otherwise, method 700 may end without any data being transferred.

In operation 714, the destination device may store the data objects to a first storage location on the destination device. This first storage location may be a staging area or backup store configured to temporarily store data for further processing.

In operation 716, the manifest may be transferred from the source device to the destination device. The manifest includes information describing the data objects and relative locations of the data objects on the source device for use in relocating the data objects to corresponding storage locations once stored to the first storage location on the destination device. In one approach, the manifest may include indication of a total number of the data objects that will be transferred from the source device to the destination device.

In operation 718, the destination device may be rebooted into a configuration mode in response to the input to configure the destination device. The configuration mode allows for exclusive access to a storage medium of the destination device, such as the first storage location. The configuration mode is entered after rebooting the destination device, without user interaction causing the destination device to reboot or enter the configuration mode.

In operation 720, while in the configuration mode, the destination device may move each of the data objects in the first storage location to second storage locations corresponding to their respective relative locations indicated in the manifest. The movement of the data objects may take place because in configuration mode, the process executing the movement commands has exclusive access to memory of the destination device.

In operation 722, the destination device may reboot in response to completing moving the data objects to the second storage locations. This allows the destination device to be configured in order to access the data objects in their respective relative locations. This second reboot may also take place without user interaction, such as logging in, providing credentials, etc., thereby making the whole migration process seamless for the user with only the first interaction being needed to start the process.

In an approach, method 700 may include determining whether an OS update is available for the destination device. For example, the OS may have a security patch, feature enhancement, or some other update that has not been performed but is available for the user. In response to determining that the update is available, the destination device may update the first OS of the destination device prior to transferring the data objects.

In one implementation, method 700 may include establishing, by the destination device, a synchronization process between a remote or cloud storage and at least some of the data objects that were previously synchronized with the remote or cloud storage on the source device. In this implementation, after transferring over the data objects that were synchronized with the remote or cloud storage, the automatic backup to the remote or cloud storage may be re-established to ensure that any changes to the synchronized data objects will be captured in the back-up location.

According to an example, method 700 may include determining, by the destination device, a size of the data objects. This size is a measurement of how much storage space is required to store the data objects on the destination device. Further, method 700 may include determining, by the destination device, whether an amount of available storage on the destination device is sufficient to store the data objects to the destination device. In this example, the destination device may transfer the data objects from the source device in response to a determination that the amount of available storage on the destination device is sufficient to store the data objects to the destination device, and the destination device may not transfer any data from the source device in response to a determination that the amount of available storage on the destination device is insufficient to store the data objects.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to improve automatic data migration and configuration services. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to migrate targeted content that is of greater interest to the user. Accordingly, use of such personal information data enables users to calculate control of the migrated data. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of automatic data migration and configuration services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, data may be selected and migrated to the new device by inferring preferences based on non-personal information data or a bare minimum amount of personal information, such as the content being requested by the device associated with a user, other non-personal information available to the automatic data migration and configuration, or publicly available information.

Example System Architecture

Figure 8:
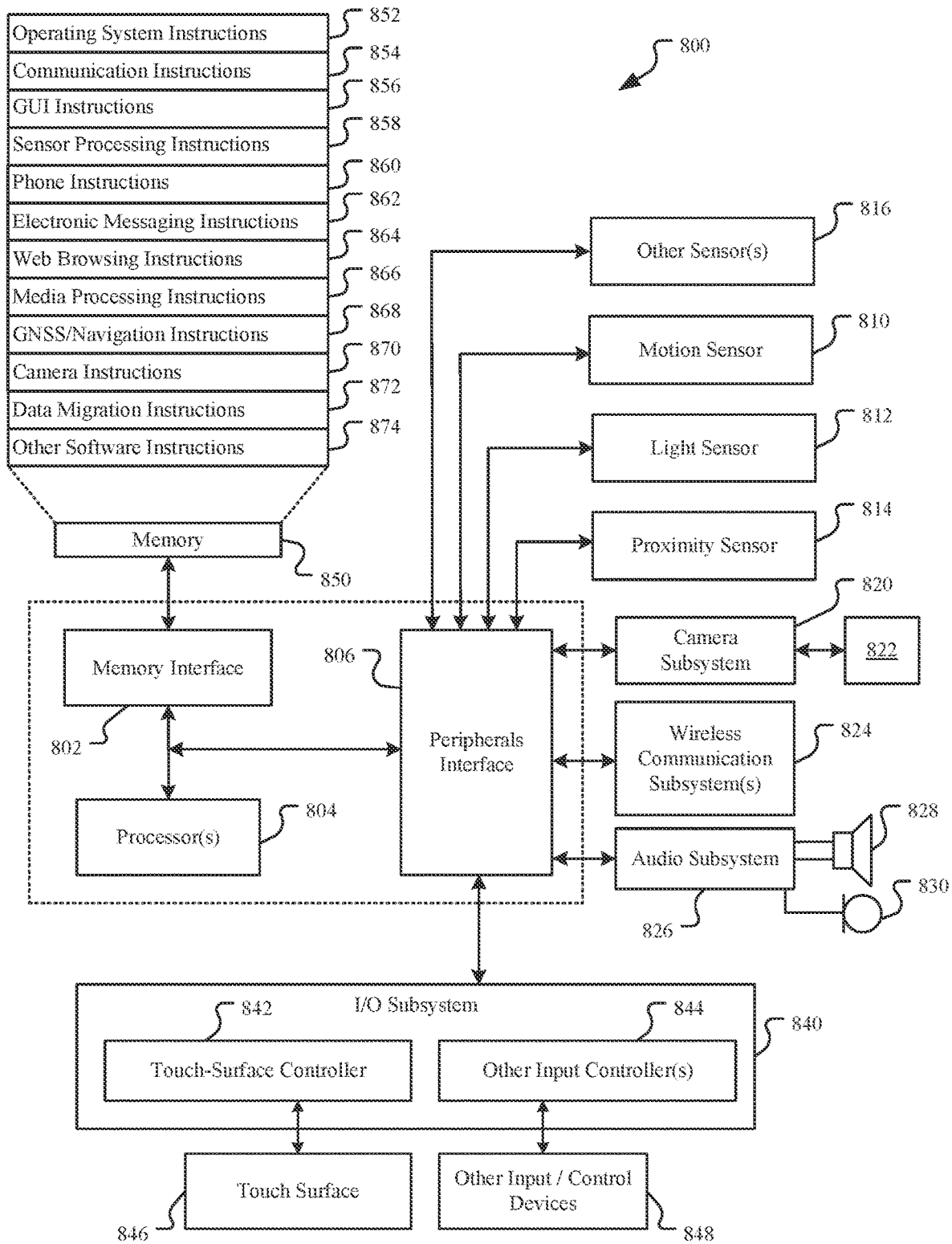
FIG. 8 is a block diagram of an example computing device that can implement the features and processes of FIGS. 1A-7.

FIG. 8 is a block diagram of an example computing device 800 that can implement the features and processes of FIGS. 1A-7. The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips. The camera subsystem 820 and the optical sensor 822 can be used to collect images of a user to be used during authentication of a user, e.g., by performing facial recognition analysis.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network. In particular, the wireless communication subsystems 824 can include hosting protocols such that the device 100 can be configured as a base station for other wireless devices.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voiceprinting and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some implementations, the computing device 800 can present recorded audio and/or video files, such as MP3, AAC, and MPEG files. In some implementations, the computing device 800 can include the functionality of an MP3 player, such as an iPod™.

The memory interface 802 can be coupled to memory 850. The memory 850 can include high-speed random-access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some implementations, the operating system 852 can be a kernel (e.g., UNIX kernel). In some implementations, the operating system 852 can include instructions for performing voice authentication. For example, operating system 852 can implement the automatic data migration and configuration features as described with reference to FIGS. 1A-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store software instructions 872 to facilitate other processes and functions, such as the automatic data migration and configuration processes and functions as described with reference to FIGS. 1A-7.

The memory 850 can also store other software instructions 874, such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

What is claimed is:

1. A non-transitory computer readable medium comprising instructions which, when executed by one or more hardware processors, causes performance of operations comprising:
   receiving, by a destination device from a source device, a manifest comprising information describing relative locations of a first set of data objects stored on the source device;
   receiving, by the destination device from the source device, the first set of data objects;
   storing, by the destination device, the first set of data objects at a first set of storage locations of the destination device; and
   based on information comprised in the manifest received from the source device, relocating the first set of data objects from the first set of storage locations on the destination device to a second set of storage locations on the destination device.

2. The medium of claim 1, wherein the operations further comprise:
   subsequent to receiving the manifest: receiving, by the destination device from the source device, a prompt to begin processing the first set of data objects.

3. The medium of claim 2, wherein the relocating operation is executed by the destination device subsequent to and based on receiving the prompt.

4. The medium of claim 1, wherein the operations further comprise rebooting the destination device into a configuration mode, subsequent to the destination device receiving the first set of data objects from the source device, wherein the relocating operations are executed in the configured mode.

5. The medium of claim 1, wherein the first set of data objects are relocated from the first set of storage locations to the second set of storage locations while the destination device.

6. The medium of claim 1, wherein relocating the first set of data objects to the second set of storage locations comprises: relocating the first set of data objects on the destination device based on the relative locations, as indicated in the manifest, of the data objects stored on the source device.

7. The medium of claim 1, wherein the first set of storage locations of the destination device comprises: a staging area or backup store of the destination device.

8. The medium of claim 1, wherein the manifest is (a) received subsequent to receiving the first set of data objects and (b) signals an end of the data transfer for transferring the first set of objects from the source device to the destination device.

9. A method comprising:
   receiving, by a destination device from a source device, a manifest comprising information describing relative locations of a first set of data objects stored on the source device;
   receiving, by the destination device from the source device, the first set of data objects;
   storing, by the destination device, the first set of data objects at a first set of storage locations of the destination device; and
   based on information comprised in the manifest received from the source device, relocating the first set of data objects from the first set of storage locations on the destination device to a second set of storage locations on the destination device,
   wherein the method is performed by at least one device including a hardware processor.

10. The method of claim 9, wherein the operations further comprise:
    subsequent to receiving the manifest: receiving, by the destination device from the source device, a prompt to begin processing the first set of data objects,
    storing, by the destination device, the first set of data objects at a first set of storage locations of the destination device; and
    based on information comprised in the manifest received from the source device, relocating the first set of data objects from the first set of storage locations on the destination device to a second set of storage locations on the destination device.

11. The method of claim 10, wherein the relocating operation is executed by the destination device subsequent to and based on receiving the prompt.

12. The method of claim 9, wherein the operations further comprise rebooting the destination device into a configuration mode, subsequent to the destination device receiving the first set of data objects from the source device, wherein the relocating operations are executed in the configured mode.

13. The method of claim 9, wherein the first set of data objects are relocated from the first set of storage locations to the second set of storage locations while the destination device is in a configuration mode in which a process, executing the relocating operation, has exclusive access to at least a portion of a memory of the destination device.

14. The method of claim 9, wherein relocating the first set of data objects to the second set of storage locations comprises: relocating the first set of data objects on the destination device based on the relative locations, as indicated in the manifest, of the data objects stored on the source device.

15. The method of claim 9, wherein the first set of storage locations of the destination device comprises: a staging area or backup store of the destination device.

16. The method of claim 9, wherein the manifest (a) is received subsequent to receiving the first set of data objects and (b) signals an end of the data transfer for transferring the first set of objects from the source device to the destination device.

17. A system comprising:
    at least one device including a hardware processor;
    the system being configured to perform operations comprising:
    receiving, by a destination device from a source device, a manifest comprising information describing relative locations of a first set of data objects stored on the source device;
    receiving, by the destination device from the source device, the first set of data objects;
    is in a configuration mode in which a process, executing the relocating operation, has exclusive access to at least a portion of a memory of the destination device.

18. The system of claim 17, wherein the operations further comprise:
    subsequent to receiving the manifest: receiving, by the destination device from the source device, a prompt to begin processing the first set of data objects;
    wherein the relocating operation is executed by the destination device subsequent to and based on receiving the prompt.

19. The system of claim 17, wherein the first set of data objects are relocated from the first set of storage locations to the second set of storage locations while the destination device is in a configuration mode in which a process, executing the relocating operation, has exclusive access to at least a portion of a memory of the destination device.

20. The system of claim 17, wherein relocating the first set of data objects to the second set of storage locations comprises: relocating the first set of data objects on the destination device based on the relative locations, as indicated in the manifest, of the data objects stored on the source device.

* * * * *